United States Patent
Sehier

(10) Patent No.: US 6,992,971 B1
(45) Date of Patent: Jan. 31, 2006

(54) ATM TELECOMMUNICATION METHOD WHEREBY THE TERMINALS TRANSMIT TO A COMMON STATION

(75) Inventor: Philippe Sehier, Saint Germain en Laye (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/830,772

(22) PCT Filed: Nov. 24, 1999

(86) PCT No.: PCT/EP99/09474

§ 371 (c)(1),
(2), (4) Date: May 1, 2001

(87) PCT Pub. No.: WO00/32007

PCT Pub. Date: Jun. 2, 2000

(30) Foreign Application Priority Data

Nov. 26, 1998  (FR) .................................. 98 14880

(51) Int. Cl.
*H04B 7/216* (2006.01)
*H04J 11/00* (2006.01)

(52) U.S. Cl. ...................... 370/203; 370/318; 370/320; 370/335; 370/342; 370/395.1; 375/131

(58) Field of Classification Search ............... 370/203, 370/206, 207, 316, 317, 318, 320, 335, 342, 370/349, 389, 395.1, 401; 375/130, 131, 375/133, 134, 140, 141, 145; 455/422.1, 455/427, 428, 445, 450, 12.1, 13.2, 13.4, 455/509, 522

See application file for complete search history.

(56) References Cited

U.S. PATENT DOCUMENTS

| 5,373,502 | A  |   | 12/1994 | Turban |
| 5,745,837 | A  | * | 4/1998  | Fuhrmann .................... 725/114 |
| 5,825,807 | A  |   | 10/1998 | Kumar |
| 6,005,854 | A  | * | 12/1999 | Xu et al. ...................... 370/335 |
| 6,078,576 | A  | * | 6/2000  | Schilling et al. ............. 370/347 |
| 6,381,229 | B1 | * | 4/2002  | Narvinger et al. ........... 370/328 |
| 6,407,993 | B1 | * | 6/2002  | Moulsley ..................... 370/347 |

FOREIGN PATENT DOCUMENTS

| EP | 0 719 062 A2 | 6/1996 |
| WO | WO 97/08861 | 3/1997 |
| WO | WO 97/34421 | 9/1997 |

OTHER PUBLICATIONS

S. Fisher et al, MAC Protocol for a CDMA Based Wireless ATM LAN, ICC 97, vol. 3, Jun. 1997, pp. 1202-1206 XP000748837.

* cited by examiner

*Primary Examiner*—Alpus H. Hsu
(74) *Attorney, Agent, or Firm*—Sughrue Mion, PLLC

(57) ABSTRACT

The invention relates to an asynchronous transfer mode method of transmitting digital signals in which terminals (16, 18) send to the same station (20). Calls are transmitted by cells (40, 42, 44, 46), the terminals send successively in separate periods (60, 62, 64, 66; 70, 72, 74), and each cell is assigned at least two orthogonal codes (C1, C2, C3, C4). In accordance with the invention, the duration of the period during which each terminal sends and/or the number of codes assigned to each terminal and/or the number of symbols assigned to a particular code in a terminal can be selected on each sending as a function of a particular power level (80).

7 Claims, 2 Drawing Sheets

ATM TELECOMMUNICATION METHOD WHEREBY THE TERMINALS TRANSMIT TO A COMMON STATION

BACKGROUND OF THE INVENTION

The invention relates to an asynchronous transfer mode method of transmitting digital data made up of cells (packets), in which method terminals send messages to a central station (control station).

It relates more particularly, but not exclusively, to a transmission method for use in a system in which calls are relayed via equipment on board a satellite in a non-geosynchronous orbit.

For optimum use of a telecommunication system it is preferable to manage the information transmitted so that at all times information can be transmitted at a bit rate equal to the maximum bit rate allowed by the system.

To this end, the information is transmitted in digital form, to limit noise and facilitate control. The digital information is usually divided into cells (packets) which can be transmitted during a given time interval—referred to as the cell interval—and the cells are transmitted with a time distribution that optimizes system use. In other words, the cells are not transmitted regularly, but in a manner that is sometimes referred to as asynchronous transfer mode; note that this does not limit the invention to the ATM standard, however.

What is more, to maximize call capacities, each cell (packet) can be allocated a carrier frequency and/or a code selected from a multiplicity of frequencies and codes.

There are three ways to divide radio resources (communication resources):
  Time Division Multiple Access (TDMA).
  Frequency Division Multiple Access (FDMA).
  Code Division Multiple Access (CDMA).

Assigning a code to a signal spreads its spectrum, i.e. multiplies the signal by a spreading code. Orthogonal codes, i.e. codes such that the product of a code multiplied by itself is equal to 1 and the product of two different codes is zero, are used for easy and powerful decoding (despreading). Then, when signals $x_1, x_2, \ldots x_i, \ldots x_n$ are transmitted simultaneously, and each is assigned a respective code $C_1, C_2, C_i, C_n$, all that is required to extract the signal $x_i$ from the sum $x_1C_1 + x_2C_2 + \ldots + x_iC_i + \ldots + x_nC_n$ is to multiply the sum by $C_i$.

U.S. Pat. No. 5,373,502 describes a transmission method in which terminals send cells to a station, the terminals send successively in separate periods, and each cell is assigned at least two orthogonal codes. This transmission technique is known as TD-CDMA.

SUMMARY OF THE INVENTION

In the context of the present invention, it is necessary not only to assign two orthogonal codes to each cell but also to take account of the attenuation characteristics of propagation between a terminal and the receiving station and the power available at the terminal.

To that end, in the invention, the duration of the period during which each terminal sends and/or the number of codes assigned to each terminal and/or the number of symbols assigned a particular code in a terminal can be selected for each transmission as a function of a determined power level.

A guard interval is advantageously provided between the end of transmission by one terminal and the start of the next transmission by another terminal.

In an advantageous embodiment, if a terminal transmits during a given time period, that period is uninterrupted. This avoids the wasteful provision of a guard time, as none is necessary in the situation in which the same terminal transmits several consecutive packets.

The duration of the period of transmission by each terminal and/or the number of codes assigned to each terminal are preferably chosen as a function of the position of the terminal relative to the station. The position of the terminal relative to the station is a criterion representative of the characteristics of the link budget between the terminal and the station (which depends on the position of the terminal and also on the position of the satellite and propagation attenuation (whether it is raining or not)).

BRIEF DESCRIPTION OF THE DRAWINGS

Other features and advantages of the invention become apparent from the following description of embodiments of the invention, which description is given with reference to the accompanying drawings, in which.

DETAILED DESCRIPTION OF THE INVENTION

Figure 1:
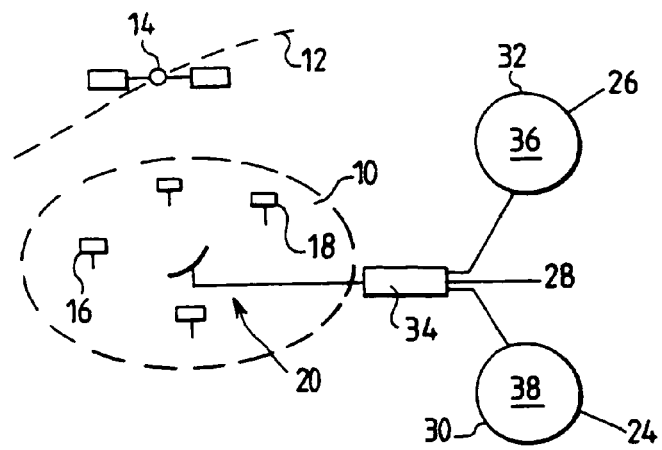
FIG. 1 shows a telecommunication system to which the invention is applied.

The method according to the invention described with reference to the figures relates to a telecommunication system which divides the surface of the Earth into areas 10, one of which is shown in FIG. 1. Each area contains a central control (connection) station 20 and terminals (subscriber stations) 16, 18, etc.

The terminals 16, 18, etc. communicate with each other via a satellite 14 in low or medium Earth orbit. In this example, the altitude of the satellite is about 1500 km. The orbit 12 of the satellite 14 contains other satellites. Several orbits 12 are provided to cover the whole or most of the Earth.

When the satellite 14 loses sight of the area 10, the next satellite (not shown), which is in the same orbit 12, for example, takes over the call.

The control and connection station 20 manages calls between the terminals 16, 18, etc. In particular, it assigns frequency, power and code resources for each terminal. To that end, each station 20 communicates with each of the terminals, also via the satellite 14.

Calls between terminals pass through the station 20. In other words, when the terminal 16 is communicating with the terminal 18, the terminal 16 sends data to the station 20 via the satellite and the station 20 forwards the data to the terminal 18, also via the satellite.

The station 20 is connected to a terrestrial network, an ATM network in this example. The station 20 is therefore connected by an ATM switch 34 to a broadband network 36, a narrowband network 38 and servers 28. The narrowband network 38 connects users 30 and servers 24. The broadband network 36 connects users 32 and servers 26.

The above kind of asynchronous transfer mode telecommunication system provides a high data bit rate with a high capacity and a short transmission time-delay.

In an asynchronous network, especially an ATM network, the data is in digital form and organized into packets (cells)

which, in accordance with the ATM standard, contain 384 data bits (symbols) and 40 header bits (symbols).

In addition to the ATM symbols, each cell is assigned twelve or sixteen additional symbols, referred to as reference symbols, which are used mainly for phase and frequency synchronization.

In developing the invention, the possibility of using the AOCDMA transmission mode to send messages from the terminals 16, 18, etc. to the station 20 was considered.

Figure 2:
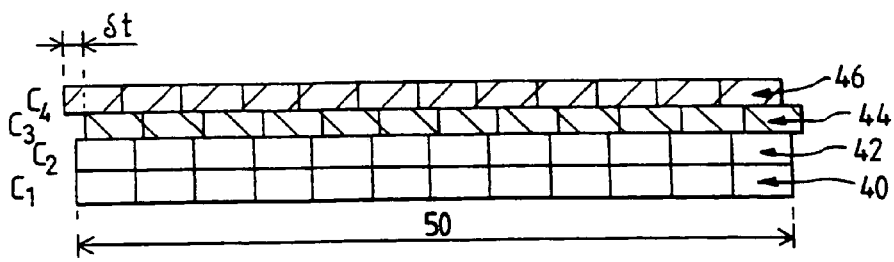
FIG. 2 is a diagram showing a method considered in developing the invention but subsequently discarded.

AOCDMA signifies "Asynchronous Orthogonal Code Division Multiple Access". In outline, as shown in FIG. 2, this method consists of simultaneously sending cells assigned different codes, each cell being assigned only one code. In the example shown in FIG. 2, the cell interval is 6 milliseconds. The terminal 16 sends two cells 40 and 42 each containing 424 symbols (bits). Cell 40 is assigned code $C_1$ and cell 42 is assigned code $C_2$.

The terminal 18 sends simultaneously a cell 44 assigned code $C_3$ and at the same time another terminal sends a cell 46 assigned code $C_4$.

Cells 40, 42, 44 and 46 are represented as they appear at the station 20. It can be seen that the cells from the various terminals arrive at the station 20 with time shifts that can be a problem. FIG. 2 shows the time shift δt between the time of arrival of cell 46 and the time of arrival of cell 44.

This lack of synchronization of the cells leads to an orthogonality defect, the consequence of which is that the correlations between $C_1C_3$, $C_1C_4$, $C_2C_3$, $C_2C_4$ and $C_3C_4$ are not strictly zero; this causes additional interference noise during despreading (despreading is sometimes referred to hereinafter as "decoding"). On the other hand, as cells 40 and 42 come from the same terminal 16, they are perfectly synchronized when they are received by the station 20 and therefore do not interfere with each other.

To overcome the problem associated with the lack of synchronization, cell interval 50 is divided into sub-intervals (FIGS. 3 and 4), each of which is assigned to only one terminal. In other words, the transmissions from the various terminals are separated in time, which avoids the lack of synchronization between cells transmitted simultaneously and assigned different codes. However, the invention retains the advantage associated with the use of codes, which is to enable the adjustment of the spectral efficiency of the modulation in order to maximize the communication resources of the system.

Because the calls sent by each terminal have a duration significantly less than a cell interval, each cell is assigned more than one code. However, because the codes are not sent by the same terminal, there is no lack of synchronization on reception.

To avoid the risk of collisions between cells on reception, it is preferable to provide a guard interval 52, 54 (FIG. 3), 56, 58 (FIG. 4) between the sub-intervals corresponding to different terminals.

Figure 3:
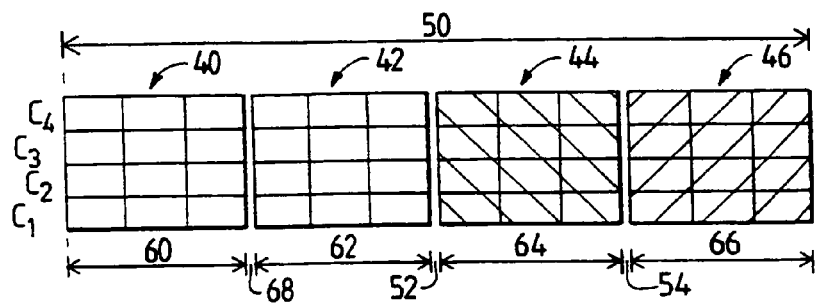
FIGS. 3 to 6 are diagrams explaining various aspects of the method of the invention.

In the simplified example shown in FIG. 3, cell interval 50 is divided into as many sub-intervals as there are cells to be transmitted. Sub-intervals 60, 62, 64 and 66 have equal durations and the same number of codes is assigned to each sub-interval. Thus in this example four codes $C_1$, $C_2$, $C_3$ and $C_4$ are provided.

Sub-intervals 60, 62, 64 and 66 are respectively assigned to cells 40, 42, 44 and 46.

Guard interval 52 separates intervals 62 and 64 and guard interval 54 separates intervals 64 and 66 assigned to different terminals. An interval 68 is also provided to separate sub-intervals 60 and 62. Interval 68 is intended to simplify management and control but is not indispensable, because cells 40 and 42 are sent by the same terminal.

Figure 4:
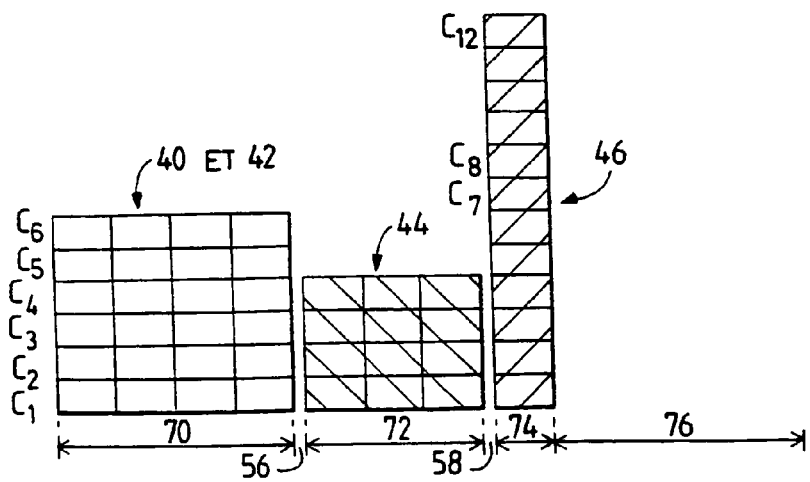

In the simplified embodiment shown in FIG. 4 the lengths of the sub-intervals differ from one terminal to the other. Thus sub-interval 70 assigned to terminal 16, and therefore to cells 40 and 42, is longer than sub-interval 72 assigned to terminal 18, and therefore to cell 44; sub-interval 74 assigned to the third terminal, i.e. to cell 46, is one-third the length of sub-interval 72. Guard interval 56 separates sub-intervals 70 and 72 and guard interval 58 separates sub-intervals 72 and 74. Also, the combination of sub-intervals 70, 72 and 74 and guard intervals 56, 58 does not occupy cell interval 50 completely, a sub-interval 76 remaining available for other calls.

Note also that in the FIG. 4 example the number of codes differs from one sub-interval to another. Thus six codes $C_1$ to $C_6$ are assigned to sub-interval 70, the first four codes $C_1$ to $C_4$ are assigned to sub-interval 72 and twelve codes $C_1$ to $C_{12}$ are assigned to sub-interval 74.

The durations of intervals 60, 62, 64, 66 (FIG. 3) or 70, 72, 74 (FIG. 4) are chosen to satisfy two contradictory constraints: on the one hand, they must be as small as possible to maximize the call capacity and, on the other hand, the peak power must not exceed a limit value imposed by the power available in the terminal or imposed by other conditions, such as avoiding interference with other systems (for example geosynchronous satellite systems) or with adjacent areas that may use the same resources; the power limit can also depend on the location of the terminal in the area 10.

The method corresponding to FIG. 3 has the advantage of great simplicity and simplifies control because of the regular distribution of time sub-intervals. In particular, it is not necessary for the receiver at the station 20 to update the composition of the cell interval, since that composition is invariant.

However, this solution does not maximize transmission capacity, on the one hand because of the presence of guard time 68 and on the other hand because the time sub-intervals cannot be matched to the characteristics of the terminal (this solution differing in this respect from the method shown in FIG. 4). The expression "characteristics of the terminals" refers in particular to the transmit power, the location within the area 10 and the code assignment possibilities.

Implementing the method shown in FIG. 4 requires more complex control or management in the modems of the system than is required to implement the method shown in FIG. 3. However, the FIG. 4 method has the advantage that it maximizes efficiency, in particular because terminals having different characteristics can send in the same cell interval without reducing capacity.

Accordingly, in FIG. 4, for example, sub-interval 70 corresponds to sending by a domestic subscriber terminal having a capacity limited to six codes but which can use its full capacity if it is near the center of the area 10. In this example, sub-interval 72 is also assigned to a domestic subscriber terminal. However, this latter subscriber terminal is near the edge of the area 10, which limits its capacity to four codes. If the terminal had to send more codes, it would require more power than the permitted limit. Finally, cell 46 is sent by a professional terminal having a code capacity (twelve codes) greater than the capacity of a domestic terminal.

Figure 5:
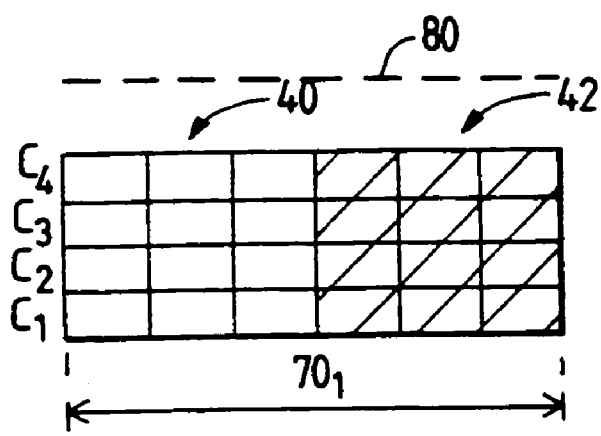
Figure 6:
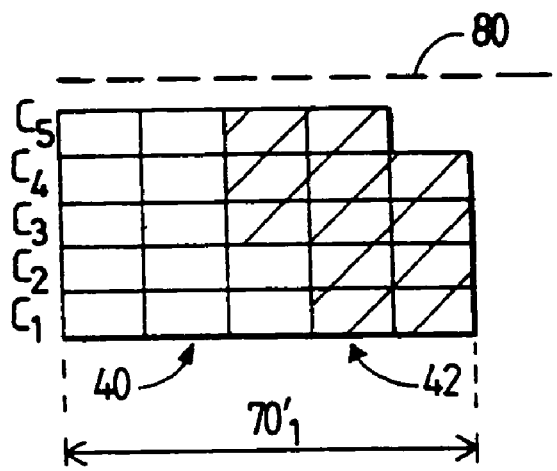

Refer now to FIGS. 5 and 6, which show two ways of assembling various symbols of two cells sent by the same terminal. The diagrams are simplified, of course, like those of FIGS. 2 to 4.

In the example shown in FIG. 5 time sub-interval $70_1$ is divided into two equal parts, with no guard time, the first part is assigned to cell 40 and the second part is assigned to cell 42. Cells 40 and 42 are assigned the same number of codes (four codes in this example).

As an alternative to this (not shown) each cell extends over the whole of time sub-interval 70, but the codes are divided between the cells, for example with codes $C_1$ and $C_2$ assigned to cell 40 and codes $C_3$ and $C_4$ assigned to cell 42.

In the example shown in FIG. 6 the number of codes (five codes) assigned to the terminal during sub-interval 70 is the maximum number, which is limited by the fact that the power transmitted must not exceed a limit 80.

That limit depends on the attenuation characteristics for propagation between the terminal and the station and the power level available at the terminal.

Also, only a part of sub-interval 70, is used.

The time division of the cells is not effected for each code at the same time. In particular, it can be seen that for codes $C_1$ and $C_2$ cell 40 contains three symbols (remember that this is a simplified example) and cell 42 contains two symbols. For codes $C_3$ and $C_4$ cell 40 contains two symbols and cell 42 contains three symbols.

Code $C_5$ is used for a shorter time than codes $C_1$ to $C_4$. It can be seen that for code $C_5$ there are only four symbols. Note also that for code $C_5$ the first two symbols are assigned to cell 40 and the last two are assigned to cell 42.

As an alternative to this (not shown), the resources are divided principally as a function of the codes, for example the ten symbols of codes $C_1$ and $C_2$ and the first two symbols of codes $C_3$ are assigned to cell 40 and the other symbols of codes $C_3$, $C_4$ and $C_5$ are used for cell 42.

In FIG. 6, time sub-interval 701, is shorter than sub-interval $70_1$ in FIG. 5, which further increases the efficiency of the system.

When, as described with reference to FIG. 6, cells are transmitted in an interleaved fashion, the number of reference symbols used for phase and frequency synchronization can be reduced, compared to the situation in which the cells are sent one after the other. For the purposes of synchronization it is possible to consider the interleaved combination of several cells as constituting a single sell. In other words, if 16 reference symbols are required to synchronize a cell, for example, the same number of symbols (16 symbols) is used if two, three or even more cells are transmitted in an interleaved fashion. The only condition to be complied with is that the symbols must be uniformly distributed in time.

The table below provides examples of the distribution of time sub-intervals for professional terminals (P terminals) and domestic terminals (D terminals). In the table, σ is the proportion of codes that can be used from the set of all available codes.

TABLE 1

|  | Number of codes available | Number of symbols per code | Number of codes used | Number of symbols per cell |
|---|---|---|---|---|
| P terminals | 40 | 11 | 40 | 440 |
| ρ = 1 | 64 | 7 | 63 | 441 |
|  | 128 | 4 | 110 | 440 |
| D terminals | 40 | 32 | 14 | 448 |
| ρ = 14/40 | 64 | 20 | 22 | 440 |
|  | 128 | 10 | 44 | 440 |

The table corresponds to the following hypotheses:
Spreading frequency ("chip" frequency): 2933 MHz
Time accuracy on arrival at central station: ±6.8 μs
Cell interval (50): 60 ms+13.6 μs
Length of each cell: 440 symbols (including reference symbols). Note that the number of reference symbols can be further reduced because the method according to the invention facilitates synchronization.

In one example an additional code is superposed on all the signals in the same area, which reduces the level of interference between calls from adjacent areas, provided of course that the codes which are superposed are different from one area to another.

Although the invention has been described in relation to a satellite telecommunication system, it applies more generally when terminals must send messages to the same station.

What is claimed is:

1. An asynchronous transfer mode method of transmitting digital signals in which terminals send to a same station, calls are transmitted by cells, said terminals send successively in separate periods, and each cell is assigned at least two orthogonal codes, characterized in that said method comprises the step of selecting, each time a terminal sends, as a function of a particular power level, at least one variable selected from the group consisting of the duration of the period during which each terminal sends; the number of codes assigned to each terminal; and the number of symbols assigned to a particular code in a terminal.

2. A method according to claim 1, characterized in that a guard interval is provided between the end of sending by one terminal and the start of the next sending by another terminal.

3. A method according to claim 1, characterized in that if a terminal sends during a given time period, that period is uninterrupted.

4. The method according to claim 1, wherein the terminals communicate with the station via a satellite.

5. A method according to claim 4, characterized in that the duration of the period of sending by each terminal is chosen as a function of its position relative to the station.

6. The method according to claim 4, characterized in that the number of codes assigned to each terminal is chosen as a function of its position relative to the station.

7. The method according to claim 4, wherein the satellite is a non-geosynchronous satellite.

* * * * *